Dec. 15, 1936.  E. W. HARTMAN  2,063,926
METHOD OF SEPARATING SOLIDS
Filed Jan. 11, 1933  4 Sheets-Sheet 3

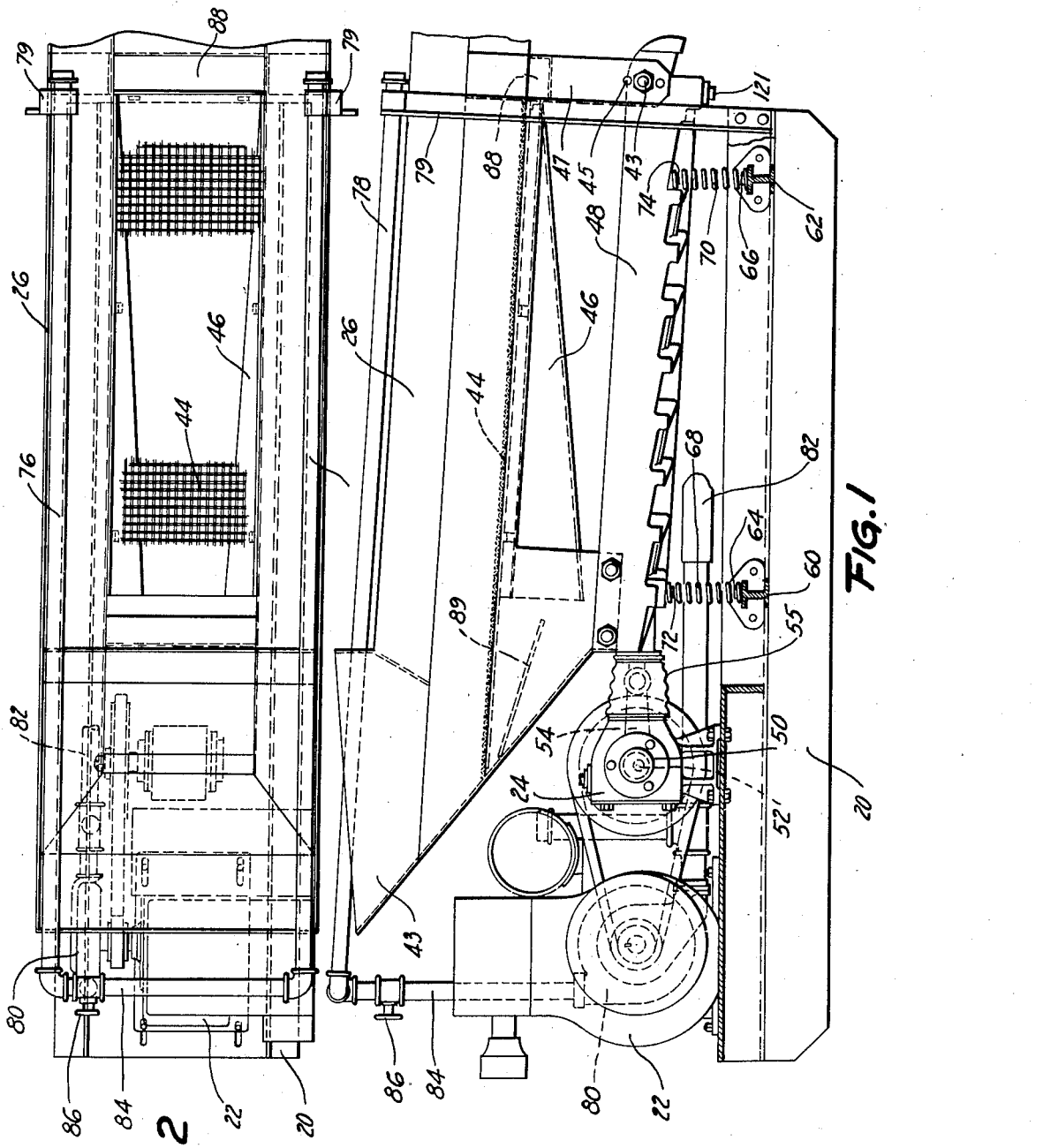

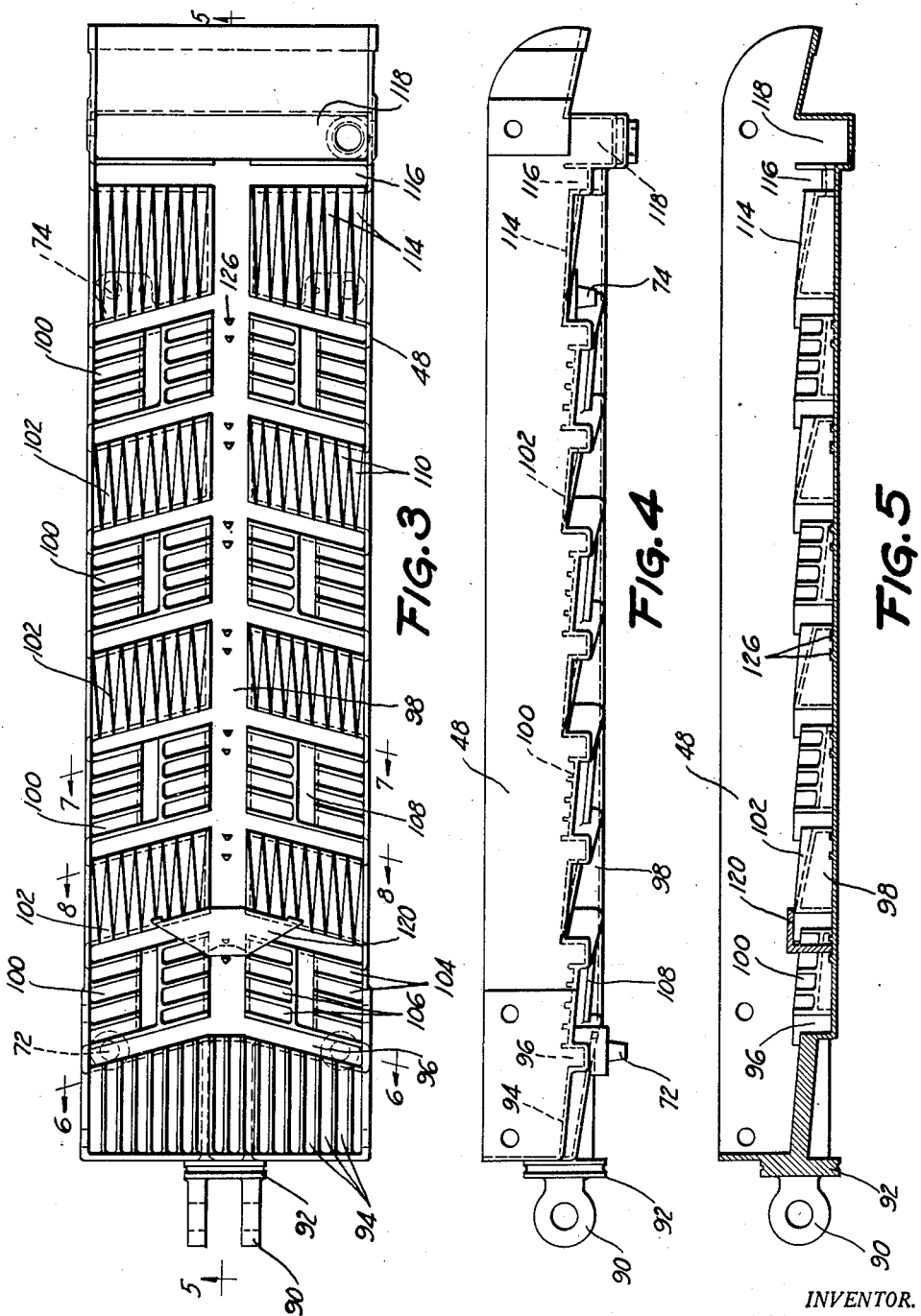

INVENTOR.
EMANUEL W. HARTMAN
BY
ATTORNEY

Dec. 15, 1936.  E. W. HARTMAN  2,063,926
METHOD OF SEPARATING SOLIDS
Filed Jan. 11, 1933   4 Sheets-Sheet 4

INVENTOR.
EMANUEL W. HARTMAN
BY
ATTORNEY

Patented Dec. 15, 1936

2,063,926

UNITED STATES PATENT OFFICE 2,063,926

METHOD OF SEPARATING SOLIDS

Emanuel W. Hartman, Glendale, Calif., assignor to Hartman Gold Placer Syndicate, Chicago, Ill.

Application January 11, 1933, Serial No. 651,196

1 Claim. (Cl. 209—422)

This invention relates to a method of separating solids and particularly to a method for separating relatively heavy or dense substances such as gold or platinum from a mass of other material of lighter average specific gravity.

Generally, the process of separation requires the breaking down of masses of metal bearing material by agitation and the application of a conveying medium or means for rapidly carrying away the lighter particles, which means may consist for example, of an air blast or water, or in some instances merely the action of gravity on an inclined vibrating table, and further the application of some form of trap of which a riffle board is a common type, into which the heavier particles may sink and be more or less free for an extended period from the action of the conveying medium or means.

It is accordingly an object of this invention to provide a method for the separation of solids of different gravities, which may be substantially continuous in operation efficient and by which large quantities of solids may be handled rapidly.

Another object of the invention is to provide an improved method for the separation of solids of different gravities in which the masses first pass through a stage of primary classification after which the lighter masses are quickly discharged, and the heavier masses subjected to an extended more vigorous treatment or secondary classification to separate the denser metals therefrom.

A further object of the invention is to provide an improved method for the separation of solids which requires a minimum of manual labor and which method may be performed at low cost.

The above and other novel features of the invention will appear more fully hereinafter from the following detailed description when taken in conjunction with the accompanying drawings illustrating apparatus upon which the method may be performed. It is expressly understood, however, that the drawings are employed for purposes of illustration only and are not designed as a definition upon the limits of the invention, reference being had for this purpose to the appended claim.

In the drawings wherein similar reference characters refer to similar parts throughout the several views:

Figure 1 is a side elevation partly in section of an ore separator apparatus upon which the method of this invention may be practiced;

Figure 2 is a top plan view of the separator of Figure 1 illustrating the arrangement of the various parts;

Figure 3 is a top plan view of the riffle board as employed in the machine of Figures 1 and 2;

Figure 4 is a side elevation of the riffle board showing the riffle contour;

Figure 5 is a longitudinal section through the riffle board on the line 5—5, of Figure 3;

Figure 6:
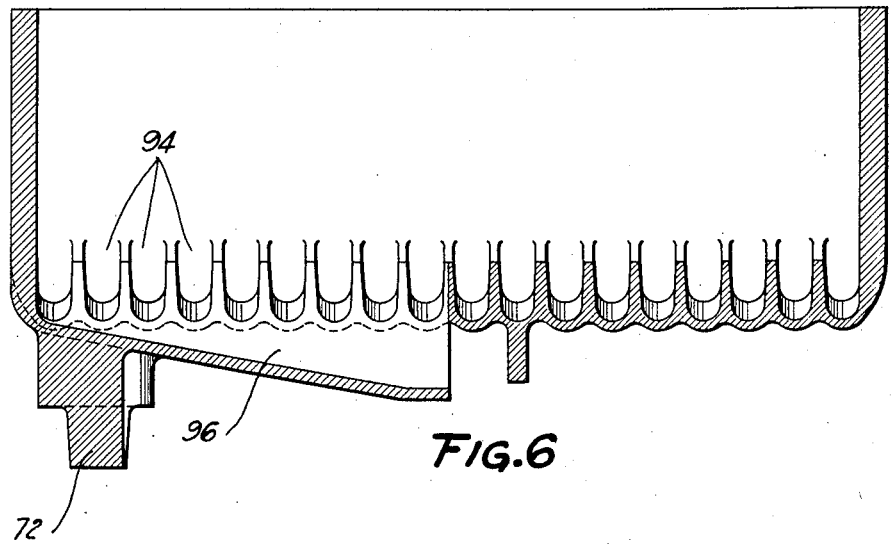
Figure 6 is a cross section through the riffle board on the line 6—6, of Figure 3.
Figure 7:
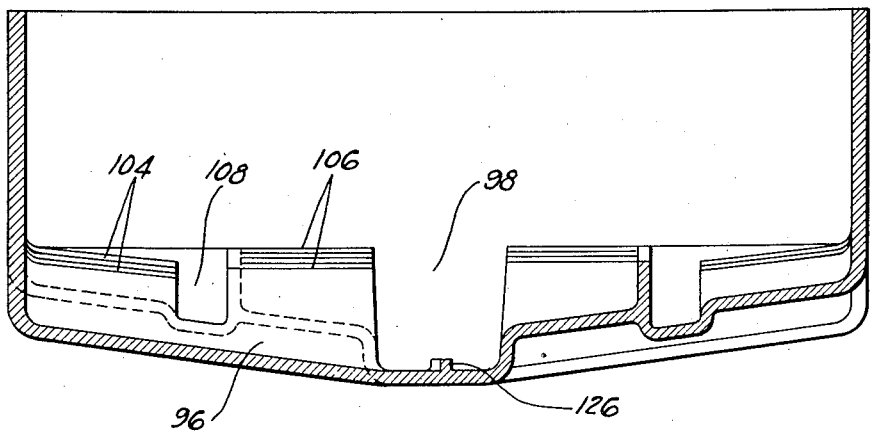
Figure 7 is a cross section through the riffle board taken on the line 7—7, of Figure 3.

Referring to the drawings and more particularly Figures 1 and 2 thereof, wherein is generally illustrated a form of apparatus adapted to perform the method of this invention, there will be seen a frame 20, carrying a small engine or prime mover 22, transmission 24 and resiliently or oscillatably mounted ore separation apparatus 26. As shown, the ore separation apparatus may include a hopper 43 adapted to discharge material upon the upper end of the sloping grizzly or screen 44, which screen is adapted to permit the finer particles to drop through upon the return chute 46 and from thence downward upon the upper end of the sloping riffle board 48. To adjust the slope of the screen, the support 47 is provided with a plurality of holes 45 for the bolt 43.

In order to continuously agitate or shake the masses while passing through the various paths provided, the engine or prime mover 22 drives the countershaft 50 in the transmission 24 which carries thereon an eccentric 52 and connecting rod 54 secured at its free end to the riffle board 48. In practice, a throw slightly in excess of a half-inch and at a rate of approximately 250 revolutions per minute has been found satisfactory although it may be found advisable to alter the speed and throw to suit various material as may be found in practice. Preferably these drive elements are totally enclosed within a suitable housing, and a flexible housing 55 may be provided to enclose the connecting rod and its connection to the riffle board.

To support the separator mechanism in a manner free from wear, it has been found preferable to provide some form of resilient support whereby the use of wearing surfaces, which in a machine of this type would be continually exposed to dirt and dust, may be avoided. To this end, there is provided upon the frame 20 a pair of cross members 60 and 62 having bosses or upward extending pins 64 and 66 upon which are snugly mounted coil springs 68 and 70, preferably four in number, which in turn engage similar bosses or pins 72 and 74 upon the under side of the riffle board. The springs while supporting the weight permit the free horizontal movement of the riffle board required for proper action. Such a suspension also may permit lateral as well as longitudinal motion, which may in some instances be found desirable, although no power connection is shown herein for producing such lateral movement directly.

In order to aid in the separation process and to provide a suitable conveying medium for the lighter masses, water is preferably discharged upon the masses in the grizzly by means of pipes 76 and 78 supported at one end upon suitable supports 79 secured to the frame 20, which pipes are provided with a plurality of suitably arranged spaced apertures directed toward the grizzly or screen. For the purpose of continuously supplying water to the pipes a pump 80, which may be mounted for direct drive on the engine shaft is provided together with suitable intake connections 82 and distributing pipes 84 and regulating valve 86 to govern the supply of water.

Since it occasionally happens that a nugget of precious metal is found which would be too coarse to pass through the grizzly, there is provided a trough or catch basin 88 at the lower end of the grizzly into which such heavy elements may fall thus preventing their discharge along with the other coarse particles or gangue of relatively no value.

In order that uneven feeding of the hopper with raw masses may not cause uneven feeding of the upper end of the riffle board, a baffle 89 may be provided to prevent the direct flow of material from the grizzly to the riffle board but on the other hand requires all material fed to the riffle board to drop off of the lower end of chute 46. This permits the machine to be fed by a steady stream as by the endless belt conveyors where large machines are used or by the hand discontinuous methods as may be found practicable with small machines.

Referring more particularly to the riffle board construction adapted to carry out the method of the invention one form of which is illustrated in detail in Figures 3–8, it will be seen that the upper or head end thereof is provided with a wrist pin bearing member 90 for the connecting rod 54 and a circular boss 92 adapted to engage in water and dust tight manner the flexible housing 55.

The board itself may consist of a casting or forging or other suitable material, the surface of which is provided with a riffle construction to produce certain steps of the novel process of this invention. Around the edge of the board and the high or head end is provided a suitable side wall of sufficient height to assure no loss of material thereover.

The surface of the board at the head end is provided with a plurality of parallel longitudinal grooves 94 sloped downwardly with respect to the plane of the board and towards the lower end thereof and enter into a crosswise channel 96, as is illustrated in detail in the sectional view of Figure 6. Preferably the crosswise channel 96, however, extends slightly oblique to the center line since such arrangement permits better movement of the mass along the board, this resulting from the fact that the longitudinal reciprocating movement may have a small component directed along an oblique running channel.

The intermediate portion of the board comprises a series of alternate sections 100 and 102 containing crosswise riffles and longitudinal riffles. The section 100 containing the crosswise riffles is preferably made up of two sets of crosswise riffles 104 and 106 on either side of a central longitudinal passage 98, the outer set of which slope into a short longitudinal channel 108, which in turn extends into a second deeper cross channel 96, similar to that just below the head end section containing the longitudinal grooves 94. The inner set of crosswise riffles slope towards and empty into the longitudinal central passage 98, all of which detail is illustrated in the section shown in Figure 7.

Figure 8:
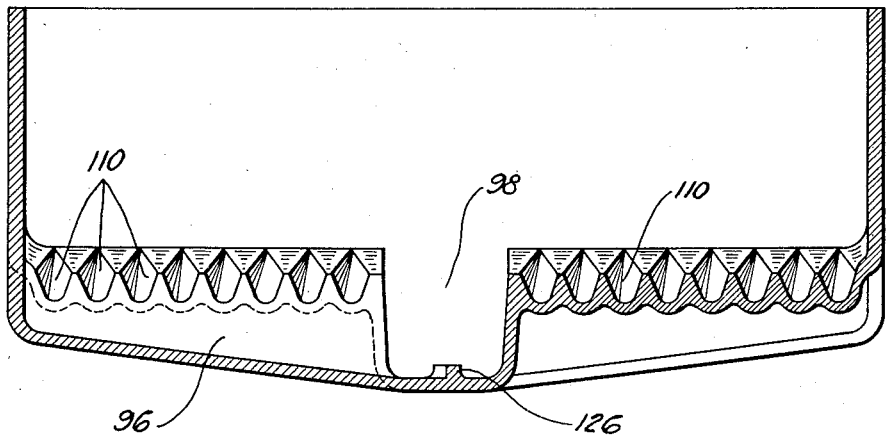
Figure 8 is a further cross section through the riffle board taken on the line 8—8, of Figure 3.
Figure 9:
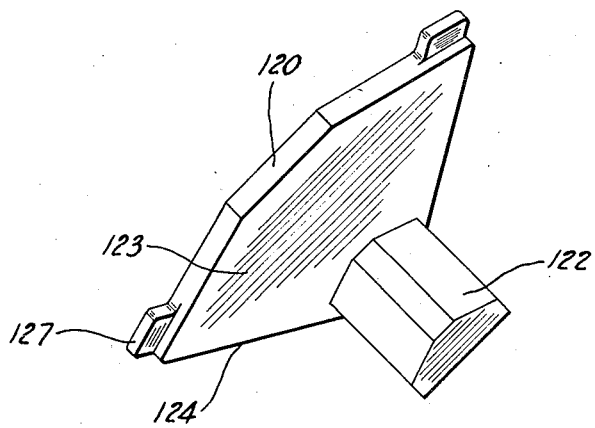
Figure 9 is a perspective view of a wing dam showing the under side thereof.

Sections 102 which are alternated with sections 100 above described, consist of a plurality of longitudinal grooves 110 of gradually increasing width and depth, and sloping downward slightly with respect to the plane of the riffle board as illustrated in Figure 8. Each of these grooves likewise empties into another crosswise channel 96 which in turn is adapted to discharge into the central longitudinal channel.

At the lower end of the board is provided a section of riffles 114 similar to those at 102, which in turn discharge into a cross channel 116, which similar to channel 96 discharges into the main channel 98. At the extreme end of the board is provided a trap or gold pocket 118 into which the channel 98 discharges and from which gold concentrate may be removed by means of the plug 121 in the base thereof, the pocket having a slope crosswise thereof, so that the plug may be at the lowest point. This pocket may be filled if desired with a quantity of mercury, which may from time to time be drawn off and replaced with fresh mercury, the mercury amalgamating with any gold which may be directed into the pocket, it being readily understood in the art that subsequently the mercury is readily distilled out of the gold in a retort in a common distillation process. The machine, however, will function efficiently without the presence of mercury.

In order to obstruct the free flow of heavier masses along the central channel 98, and to keep the masses passing along the top more or less evenly distributed over the surface, wing dams 120 are provided, one of which is shown in place in Figure 3. As illustrated, the wing dam comprises a tongue portion 122 which is adapted to extend into the channel, and a flat upper portion, which spreads out over the surface of the board. The leading edges 124 of the wing dam present a sloping surface which tends to spread out the lighter material flowing across the top of the board and tends to neutralize the effect of the opposite slope of the riffles. These wing dams also increase the turbulence of the water which may pass over them, and as a result assure the wetting of all particles, thus preventing the possibility of flake gold being carried away on the stream. To hold the wing dam in place, bosses or projecting lugs 126 may be provided in the base of the central channel 98, which lugs are preferably streamlined and engage either side of the tongue portion 122 of the wing dam. The wing part 123 may be provided with lugs 127, which engage the upper corner of the adjacent section, as shown, the section being 102. It may also be found desirable to extend the tongue portion 122 short of the bottom of the channel, so that heavy particles on the bottom of the channel may pass on down the channel and thus be trapped in the pocket at the lower end. In such an instance the lugs 126 may be extended sufficiently high to meet the tongue and secure it in place.

The operation of the machine with the exception of the riffle board will readily follow from the foregoing detailed description thereof. The fundamental purpose of the riffle board is to separate the denser particles from the particles of lesser density, which is accomplished by vibrating the board, creating movement between the material particles thereby permitting the particles of greater density to be precipitated through the lighter material to a lower level by gravitational action. A primary stratification with the lighter material above and the denser material below is thus created.

A secondary state of separation then follows and consists of bringing about a separation of the denser particles in the aforementioned lower strata. The density ratio existing between the material particles in the lower strata is progressively less than the ratio which existed between these particles and those in the upper strata; hence, the time required to bring about a separation, or fining down of these particles, will be prolonged.

The design of the table surface, makes provision for the additional time required by its irregular surface contour of grooves and channels, into which the denser particles are precipitated, in that it compels the denser particles of material to follow a tortuous or elongated path and extends the period of separation—also by having the denser material confined between the side walls of the channel system it is subject to more violent agitation or vibratory movement than the material in the upper strata above the table surface as it moves along the grooves and channels to the catch basin or end trough where it is retained, and periodically manually removed. The added intensity of vibratory movement, to which the material in the intercommunicating channel system is subject to, is an added stimulus to the further separation of the denser particles, such as gold or platinum from the metallic black sands and causes the extremely dense particles to be eventually precipitated to the floor of the channels and move along that surface to the floor of the catch pocket; and as the accumulation of the densest particles such as gold and platinum increases in depth, the lighter of the denser material in the pocket will be displaced until they pass over the discharge lip of the table.

From the foregoing it is very apparent that by this method of separation, the initial stage of separation is readily and quickly accomplished due to the favorable density ratio between the material particles in the strata above the surface of the table. In view of this rapid separation, the lighter materials which constitute the major portion of the mass can be moved over the table at a more rapid speed and discharged, while the denser particles are subject to a prolonged separating action, and the extreme dense particles retained; hence, by this method the volume of material treated is greatly increased.

Though only one form of apparatus upon which the method of this invention may be carried out has been illustrated and described, it is to be understood that the invention is not limited to such apparatus but may be carried out upon apparatus of varying mechanical forms. For example, the substitution of one conveying medium for another may be made as set forth, and the slopes and angles of the various parts may be altered to suit conditions and varying ores, and may even be altered so as to do away with the necessity of a conveying medium such as air or water. As such and many other forms of construction may be employed for use with the herein described method without departing from the spirit of the invention, as will be apparent to those skilled in the art, reference will be had to the appended claim for a definition of the limits of the invention.

What is claimed is:

The method of classification of material in accordance with specific gravity which comprises moving a thick layer of material in one general direction at a comparatively rapid rate, simultaneously vibrating the thick layer of material in the direction of its movement to cause precipitation of the heavier particles to the bottom of the layer, simultaneously vibrating the heavier precipitated particles with comparatively greater vigor while restraining the rapid movement of the precipitated heavier particles in the direction of movement of the thick layer by causing stages of transverse movement thereof toward the center of the layer and simultaneously directly causing transverse movement of only the unprecipitated material toward each side and away from the center and in opposition to the transverse movement of the precipitated heavier particles whereby even distribution of the material across the board is maintained and whereby large quantities of material may be rapidly disposed of during a primary stage of precipitation and a small precipitated quantity of heavier particles disposed of only after a secondary stage of prolonged vigorous treatment sufficient to precipitate the rare dense particles.

EMANUEL W. HARTMAN.